(12) United States Patent
Takahashi et al.

(10) Patent No.: US 6,493,397 B1
(45) Date of Patent: Dec. 10, 2002

(54) RADIO COMMUNICATION DEVICE AND RADIO COMMUNICATION METHOD

(75) Inventors: Hideyuki Takahashi, Yokosuka (JP); Katsuhiko Hiramatsu, Yokosuka (JP)

(73) Assignee: Matsushita Electric Industrial Co. Ltd., Osaka (JP)

(*) Notice: Subject to any disclaimer, the term of this patent is extended or adjusted under 35 U.S.C. 154(b) by 0 days.

(21) Appl. No.: 09/319,941

(22) PCT Filed: Oct. 19, 1998

(86) PCT No.: PCT/JP98/04712

§ 371 (c)(1),
(2), (4) Date: Jun. 18, 1999

(87) PCT Pub. No.: WO99/21334

PCT Pub. Date: Apr. 29, 1999

(30) Foreign Application Priority Data

Oct. 20, 1997 (JP) ............................................. 9-306559

(51) Int. Cl.⁷ ......................... H04B 15/00; H04L 25/08
(52) U.S. Cl. ...................................... 375/285; 375/346
(58) Field of Search ............................... 375/267, 285, 375/347, 344, 371, 346

(56) References Cited

U.S. PATENT DOCUMENTS

| | | | |
|---|---|---|---|
| 5,461,646 A | * 10/1995 | Anvari | ........................ 375/267 |
| 5,684,836 A | 11/1997 | Nagayasu et al. | |
| 5,802,117 A | * 9/1998 | Ghosh | ........................ 375/344 |
| 5,818,882 A | * 10/1998 | Komatsu | ..................... 375/344 |
| 6,028,894 A | * 2/2000 | Oishi et al. | ................. 375/227 |

FOREIGN PATENT DOCUMENTS

| | | |
|---|---|---|
| EP | 0718971 | 6/1996 |
| JP | 63-42253 | 2/1988 |
| JP | 2214245 | 8/1990 |
| JP | 4100357 | 4/1992 |
| JP | 5110616 | 4/1993 |
| JP | 6261091 | 9/1994 |
| JP | 7066842 | 3/1995 |
| JP | 7321868 | 12/1995 |
| JP | 8228208 | 9/1996 |
| JP | 9162943 | 6/1997 |

* cited by examiner

*Primary Examiner*—Don N. Vo
(74) *Attorney, Agent, or Firm*—Greenblum & Bernstein, P.L.C.

(57) ABSTRACT

A compensator eliminates frequency offset contained in digital-converted signals output from A/D converters. A weighting coefficient calculator, a complex multiplier and an adder eliminate an interference component from a signal from which frequency offset is eliminated. A differential coherent detector demodulates a signal from which the interference component is eliminated. A decoder decodes the demodulated signal, while a frequency offset estimator estimates frequency offset using the demodulated signal and a known symbol.

18 Claims, 13 Drawing Sheets

○ ● POSITION OF RECEIVED SIGNAL IN 8PSK

GROUP A

GROUP B

ROTATE GROUP B BY 45°

RADIO COMMUNICATION DEVICE AND RADIO COMMUNICATION METHOD

TECHNICAL FIELD

The present invention relates to a radio communication apparatus and a radio communication method used in a radio communication system such as a portable telephone and a car telephone.

BACKGROUND ART

In a radio communication, a phase of a received signal rotates against a phase of the transmitted signal by frequency offset. It is thereby necessary to compensate frequency offset on a received signal prior to demodulate in order to maintain good reception qualities.

FIG. 1 is a block diagram illustrating a configuration of a conventional radio communication apparatus. In addition, a QPSK modulation system is assumed as a modulation system in the following description.

In a radio communication apparatus illustrated in FIG. 1, a signal of carrier frequency received at antenna 1 is converted into a baseband signal at receiving RF section 2. An in-phase component and a quadrature component of the baseband signal are next converted into digital signals respectively at A/D converter 3 and A/D converter 4, subjected to compensation at compensator 5 and then demodulated at differential coherent detector 6 by differential coherent detection.

The demodulated signal is next decoded at decoder 7 to be a received message. Further, the demodulated signal is output to frequency offset estimator 8 and subjected to phase comparison with a known symbol.

FIG. 2 is an operation explanation diagram to explain compensation of frequency offset in a radio communication apparatus in the conventional system. A signal transmitted as (1,1) is plotted at point A under an ideal condition. However, the signal is actually plotted at point B different from point A because the phase rotates by frequency offset.

A phase rotation amount is calculated at frequency offset estimator 8, and a frequency offset amount is estimated as $\theta_1$ in FIG. 2.

The estimated frequency offset amount is returned to compensator 5 to be used in compensation of next slot. In other words, the digital signals next converted at A/D converter 3 and A/D converter 4 are compensated by frequency offset amount ($\theta_1$) at compensator 5 and output to differential coherent detector 6.

As described above, the conventional radio communication apparatus estimates a frequency offset amount by phase comparison with a known symbol and improves reception qualities by performing the compensation with this frequency offset amount.

However, in the above-described conventional radio communication apparatus, since the case where an interference station is present is not considered adequately, it is impossible to estimate a correct frequency offset under the condition where an interference station is present.

For example, as illustrated in an operation explanation diagram in FIG. 3, a signal transmitted as (1,1), which is plotted at point A under an ideal condition, is plotted at point C because the phase rotates by frequency offset amount $\theta_1$ and interference component phase amount $\theta_2$.

In this case, when an offset estimation is performed using a signal having an interference component by the above-described method, the offset estimation includes not only frequency offset amount $\theta_1$ that should be only estimated but also phase rotation amount $\theta_2$, i.e., the added result $\theta_1+\theta_2$ is estimated as a frequency offset amount. Therefore reception qualities are deteriorated when the compensation is performed under such a condition.

DISCLOSURE OF INVENTION

The first object of the present invention is to provide a radio communication apparatus and radio communication method capable of correctly estimating frequency offset to compensate even when an interference signal is present.

This object is achieved by eliminating frequency offset contained in a digital-converted received signal to demodulate, and estimating the frequency offset using the demodulated signal and a known symbol while decoding the demodulated signal.

The second object of the present invention is to provide a radio communication apparatus and radio communication method capable of decreasing a calculation amount to reduce an affect due to fading and noise in the estimation of frequency offset.

This object is achieved by rearranging all signals at the first quadrant once to average and estimating frequency offset using the averaged value.

BRIEF DESCRIPTION OF DRAWINGS

The above and other objects and features of the invention will appear more fully hereinafter from a consideration of the following description taken in connection with the accompanying drawing wherein one example is illustrated by way of example, in which.

BEST MODE FOR CARRYING OUT THE INVENTION

An interference suppression and frequency offset estimation are performed in the embodiments of the present invention described below. At this stage, a weighting coefficient should be calculated using a received signal of which frequency offset is compensated in order to increase interference suppression effects. In addition, the frequency offset should be estimated using a differential coherent detected signal of which interference component is adequately eliminated in order to increase a frequency offset estimation accuracy. Therefore, there is a risk that the control may diverge unless the interference suppression and frequency offset estimation both function correctly.

The embodiments of the present invention will be described in detail below with reference to accompanying drawings. In addition, a QPSK modulation is assumed as a modulation system in the description below.

(First Embodiment)

Figure 1:
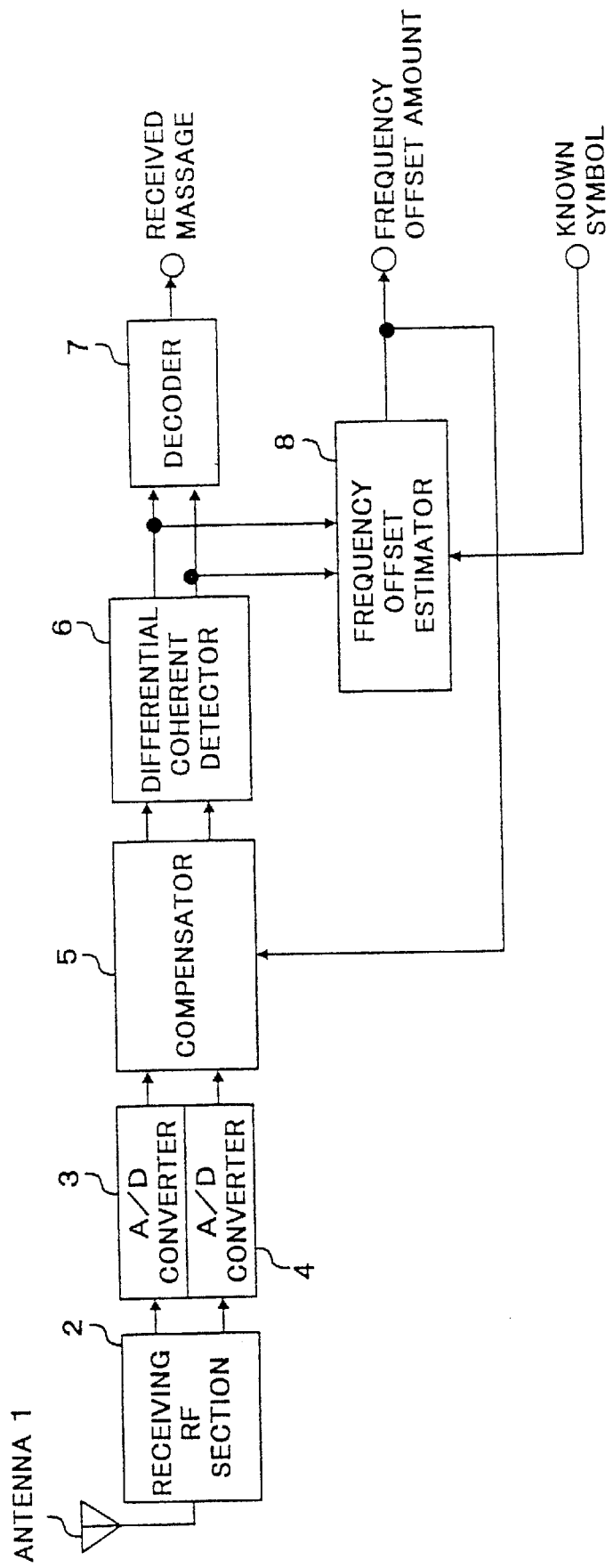
FIG. 1 is a block diagram illustrating a configuration of a radio communication apparatus in the conventional system.
Figure 2:
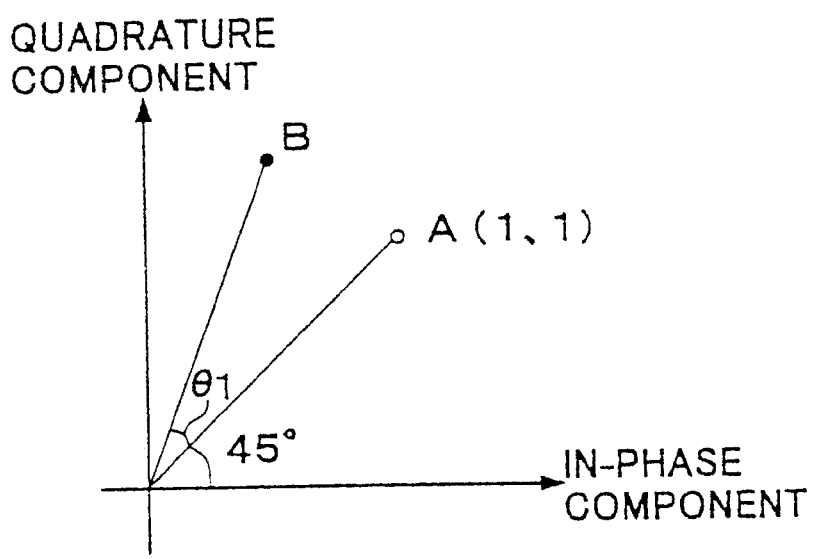
FIG. 2 is an operation explanation diagram to explain compensation of frequency offset in the radio communication apparatus in the conventional system.
Figure 3:
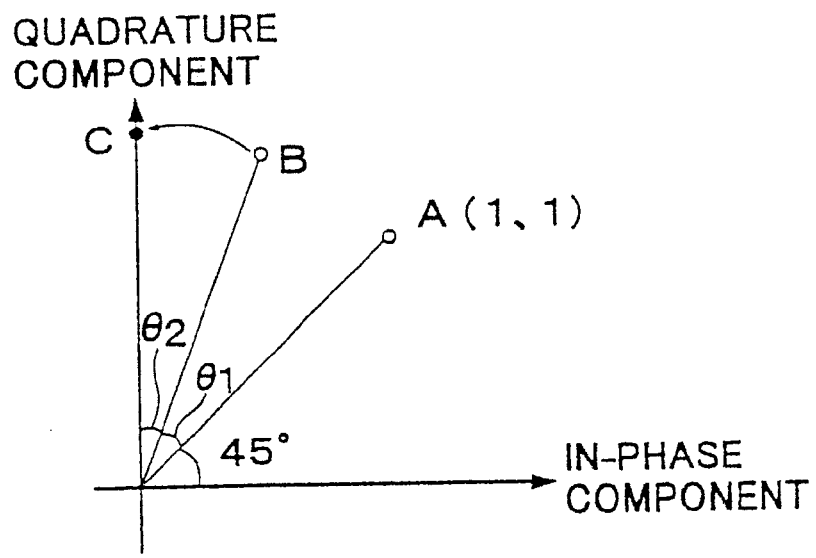
FIG. 3 is an operation explanation diagram to explain compensation of frequency offset in the radio communication apparatus in the conventional system.
Figure 4:
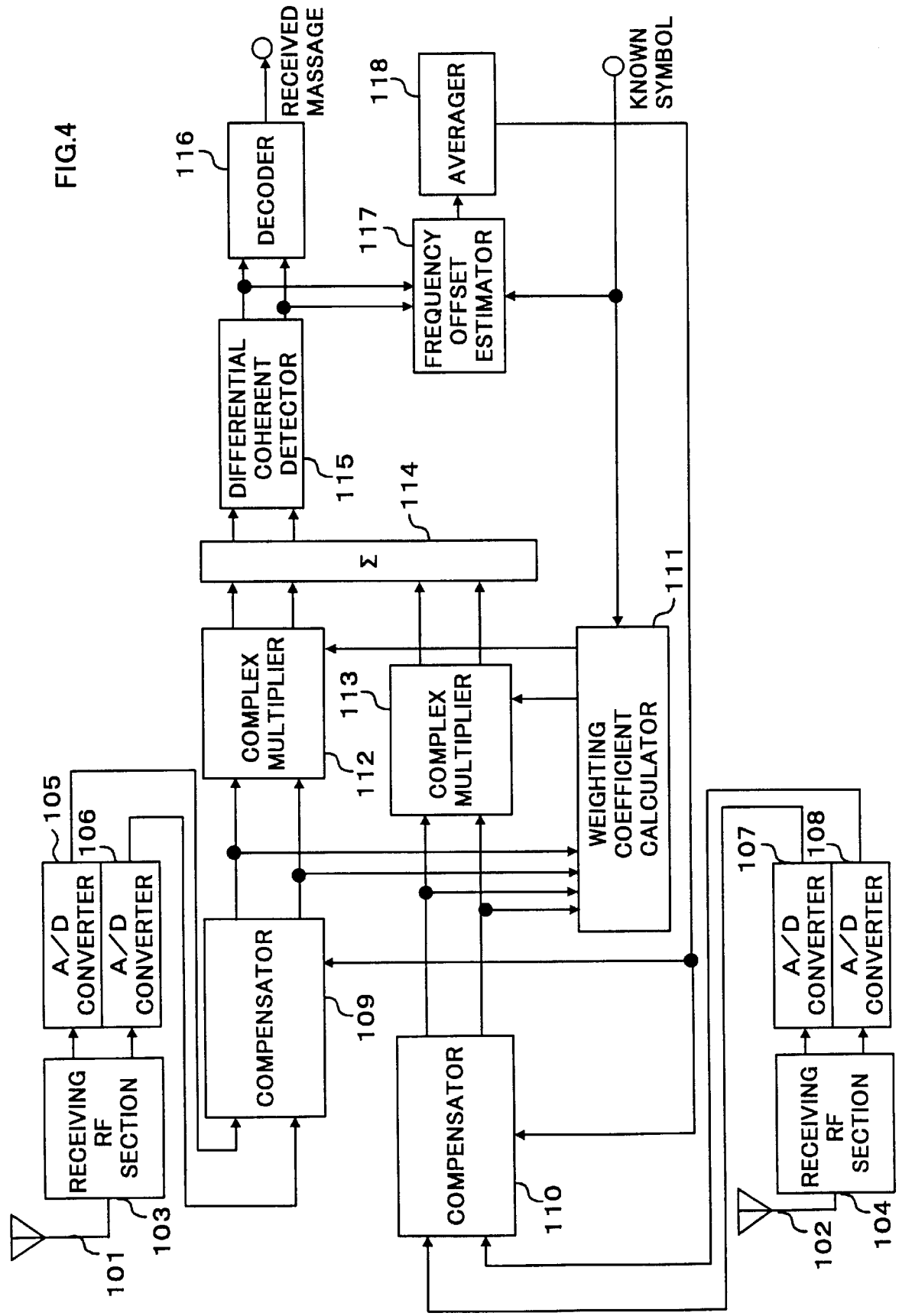
FIG. 4 is a block diagram illustrating a configuration of a radio communication apparatus according to a first embodiment.

FIG. 4 is a block diagram illustrating a configuration of a radio communication apparatus according to the first embodiment of the present invention.

In the radio communication apparatus illustrated in FIG. 4, receiving RF section 103 converts a signal of carrier frequency received at antenna 101 into a baseband signal. In addition, receiving RF section 104 converts a signal of carrier frequency received at antenna 102 into a baseband signal.

A/D converter 105 performs analog-to-digital conversion with respect to an in-phase component of the baseband signal output from receiving RF section 103, while A/D converter 106 performs analog-to-digital conversion with respect to a quadrature component of the baseband signal output from receiving RF section 103. Similarly A/D converter 107 performs analog-to-digital conversion with respect to an in-phase component of the baseband signal output from receiving RF section 104, while A/D converter 108 performs analog-to-digital conversion with respect to a quadrature component of the baseband signal output from receiving RF section 104.

Compensator 109 compensates frequency offset contained in each of output signals from A/D converters 105 and 106 using a frequency offset amount of a slot just before the target slot as a control value. Similarly compensator 110 compensates frequency offset contained in each of output signals from A/D converters 105 and 106 using a frequency offset amount of a slot just before the target slot as a control value.

Weighting coefficient calculator 111 calculates an optimal weighting coefficient using a known symbol and outputs signal from compensators 109 and 110. Complex multiplier 112 performs complex multiplication processing on the output signal from compensator 109 using the optimal weighting coefficient, and complex multiplier 113 performs complex multiplication processing on the output signal from compensator 110 using the optimal weighting coefficient. Adder 114 adds the output signal from complex multiplier 112 and the output signal from complex multiplier 113.

Differential coherent detector 115 performs differential coherent detection on the output signal from adder 114 to output demodulated signal. Decoder 116 decodes the demodulated signal to capture a received message.

Frequency offset estimator 117 estimates frequency offset using a known symbol and the demodulated signal. Averager 118 performs smoothing on the frequency offset in order to stabilize the compensation then output the resultant to compensators 109 and 110.

A flow of a signal in the radio communication apparatus according to the first embodiment will be described below.

A signal of carrier frequency received at antenna 101 is converted into a baseband signal at receiving RF section 103. An in-phase component and quadrature component of the baseband signal are next converted into digital signals respectively at A/D converter 105 and A/D converter 106.

Similarly, a signal of carrier frequency received at antenna 102 is converted into a baseband signal at receiving RF section 104. An in-phase component and quadrature component of the baseband signal are next converted into digital signals respectively at A/D converter 107 and A/D converter 108.

When it is assumed that fading is fixed in a slot, output signal $x_a(t)$ from A/D converters 105 and 106 and output signal $x_b(t)$ from A/D converters 107 and 108 are represented with equation (1) indicated as follows;

$$x_a(t)=\exp\{j(\phi(nt)+\theta_0+n\Delta\theta_f)\} \times A\ \exp\{ja\}$$

$$x_b(t)=\exp\{j(\phi(nt)+\theta_1+n\Delta\theta_f)\} \times B\ \exp\{jb\}\Lambda \tag{1}$$

where $\Delta\theta_f$ is frequency offset, $\theta_0$ and $\theta_1$ are initial phases, $\phi(nt)$ is a phase of nth symbol and $A\exp\{ja\}$ and $B\exp\{jb\}$ are fading.

The output signals from A/D converters 105 to 108 are subjected to compensation that will be described later at compensators 109 and 110 and output to weighting coefficient calculator 111 and complex multipliers 112 and 113.

Weighting coefficient calculator 111 calculates an optimal weighting coefficient using a known symbol sequence of the received signal and output signals from compensators 109 and 110. When the optimal weighting coefficient is fixed in a slot, optimal weighting coefficient $w_a(t)$ for antenna 1 and optimal weighting coefficient $w_b(t)$ for antenna 2 are represented with equation (2) indicated below.

$$w_a=C\ \exp\{jc\},\ w_b=D\ \exp\{jd\}\Lambda \tag{2}$$

The data sequence of the received signal is subjected to complex multiplication processing at complex multipliers 112 and 113 for every symbol to eliminate an interference signal and added at adder 114. S/N ratio (signal to noise ratio) is also improved by combining a signal from each antenna.

Signal y(nt) output from adder 114 is represented with equation (3) indicated below using equations (1) and (2). As illustrated in equation (3), frequency offset $\Delta\theta_f$ is not changed by performing complex multiplication processing to eliminate an interference signal.

$$y(nt)=\exp\{j(\phi(nt)+\theta_0+n\Delta\theta_f)\}\times AC \exp\{j(a+c)\}+\exp\{j(\phi(nt)+\theta_1 n\Delta\theta_f)\}\times BD \exp\{j(b+d)\}\Lambda \quad (3)$$

The output signal from adder 114 is multiplied at differential coherent detector 115 by a complex conjugate signal that is a symbol just before the target symbol. Output signal z(t) from differential coherent detector 115 is represented with equation (4) as follows;

$$z(t)=y(nt)\times y^*((n-1)t)\Lambda \quad (4)$$

wherein * indicates complex conjugate.

Further, output signal z(t) from differential coherent detector 115 is represented with equation (5) below by substituting equation (3) for equation (4).

$$z(t)=\exp[j\{\phi(nt)-\phi((n-1)t)\}]\times\exp\{j(\Delta\phi_f)\}\times\{2ABCD \cos(\theta_0-\theta_1+a-b+c-d)+A^2C^2+B^2D^2\}\Lambda \quad (5)$$

It is understood from (5) that a phase of the output signal from differential coherent detector 115 rotates by frequency offset $\Delta\theta_f$.

As described above, it is possible to improve the estimation accuracy by eliminating an interference signal by complex multiplication processing and then estimating the frequency offset.

The output signal from differential coherent detector 115 is decoded at decoder 116 to capture a received message.

In addition, the output signal from differential coherent detector 115 is subjected to phase comparison with a known symbol at frequency offset estimator 117, of which result is used to calculate a rotation amount due to frequency offset to estimate the frequency offset. In addition, it is possible to reduce affects by fading and noise by averaging the estimated frequency offset over the predetermined number of symbols.

The estimated frequency offset is subjected to smoothing processing at averager 118. According to the smoothing processing, a fluctuation of control value at compensators 119 and 110 becomes dull, which stabilizes a compensation control of frequency offset.

Figure 5:
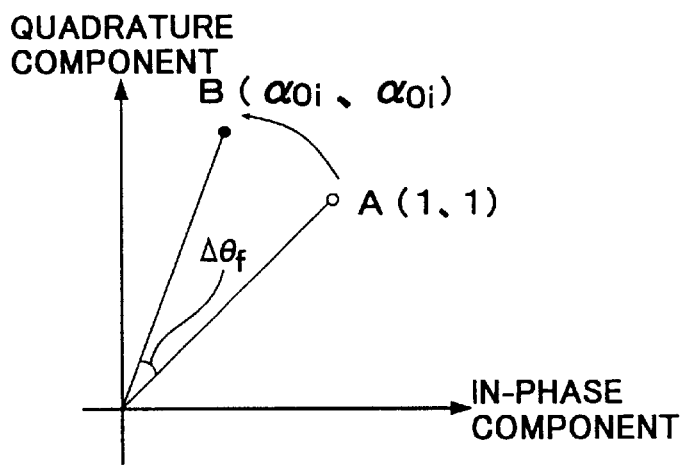
FIG. 5 is an operation explanation diagram to explain compensation of frequency set in the radio communication apparatus according to the first embodiment.
Figure 6:
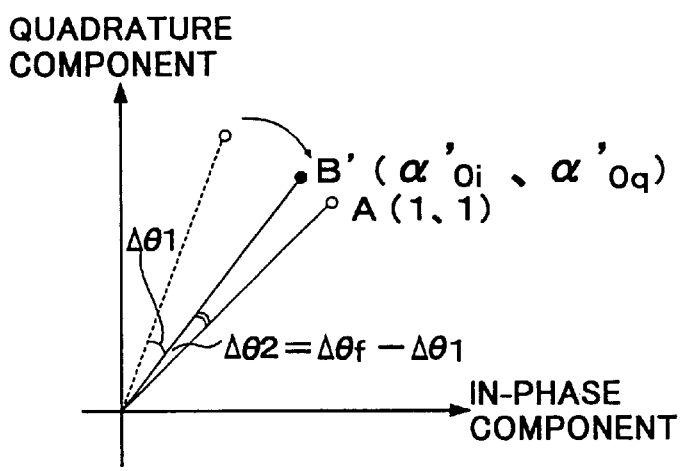
FIG. 6 is an operation explanation diagram to explain the compensation of frequency offset in the radio communication apparatus according to the first embodiment.
Figure 7:
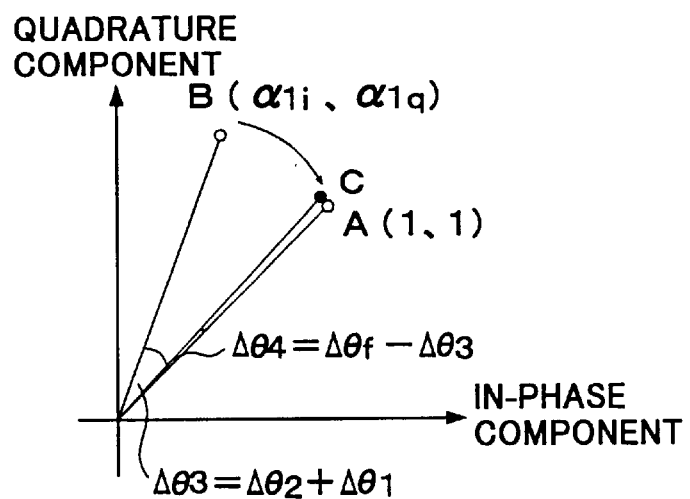
FIG. 7 is an operation explanation diagram to explain the compensation of frequency offset in the radio communication apparatus according to the first embodiment.

Compensation of frequency offset will be described below using operation explanation diagrams in FIGS. 5 to 7. When it is assumed to receive a signal ($\alpha_{0i}$, $\alpha_{0q}$) in which phase rotation $\Delta\theta_f$ is generated due to frequency offset, as illustrated in FIG. 5, and that a phase estimated at frequency offset estimator 117 is $\Delta\theta_1$, output signals ($\alpha'_{0i}$, $\alpha'_{0q}$) from compensators 109 and 110 are represented with equation (6) indicated below.

$$\alpha'_{0i}+j\alpha'_{0q}=(\alpha_{0i}+j\alpha_{0q})\exp(-j\Delta\theta_1)\Lambda \quad (6)$$

In addition, as a frequency offset estimation value $\Delta\theta_2$ of next symbol, since a reverse phase rotation (rotation toward a direction which eliminates a phase rotation amount of frequency offset) is performed by $\Delta\theta_1$ at compensators 109 and 110, residual frequency offset is adopted according to equation (7) indicated below.

$$\Delta\theta_2=\Delta\theta_f-\Delta\theta_1\Lambda \quad (7)$$

In addition, final control amount $\Delta\theta_3$ of next symbol is represented with equation (8) indicated below.

$$\Delta\theta_3=\Delta\theta_2+\Delta\theta_1\Lambda \quad (8)$$

As described above, frequency offset compensation is performed after an interference signal is eliminated by complex multiplication processing using an estimated frequency offset value as a control value. Therefore, it is possible to eliminate an interference signal and frequency offset even in the case where a received signal is affected by fading and noise when an interference signal is present and a reception condition is coarse, thereby enabling obtaining of a received signal with no control divergence, high interference suppression effect and high accurate frequency offset. Further, a frequency offset value can be made small asymptotically by a recursive iteration of the processing and come close to a desired signal point position.

(Second Embodiment)

The second embodiment is the case where a received signal of a slot is stored at a buffer, frequency offset is estimated in the same way as the first embodiment at the first processing operation, and the received signal of a current slot stored at the buffer is compensated using the frequency offset amount estimated by the current slot at the second processing operation.

Figure 8:
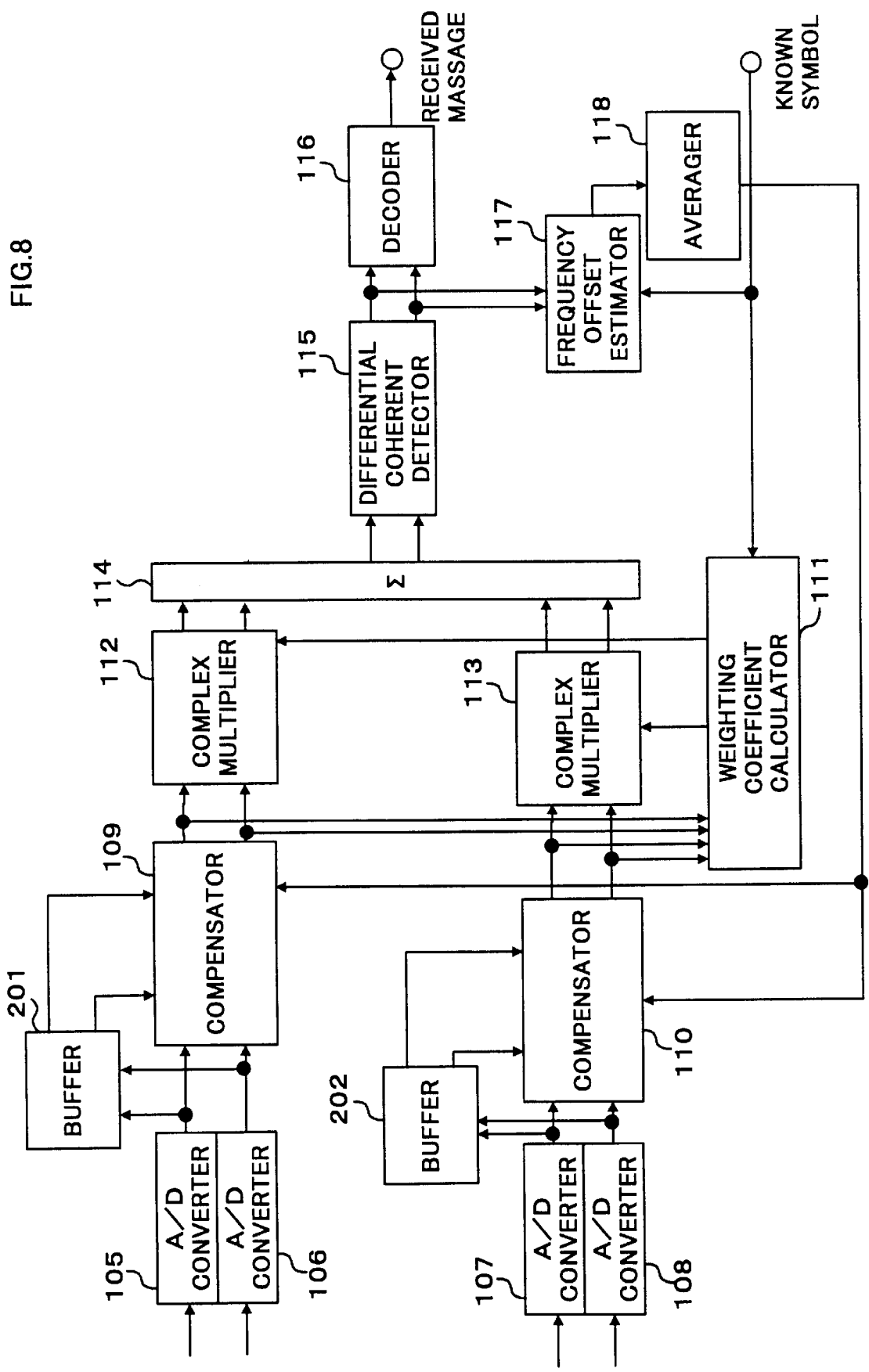
FIG. 8 is a block diagram illustrating a configuration of a radio communication apparatus according to a second embodiment.

FIG. 8 is a block diagram illustrating a configuration of a radio communication apparatus according to the second embodiment of the present invention. The radio communication apparatus illustrated in FIG. 8 adopts a configuration where buffer 201 and buffer 202 are installed in the radio communication apparatus illustrated in FIG. 4. In addition, in the radio communication apparatus illustrated in FIG. 8, the common sections to FIG. 4 have the same symbols as FIG. 4 to omit the explanation. In addition, in FIG. 8, antennas 101 and 102 and receiving RF sections 103 and 104 are omitted.

Buffer 201 is to store message parts of an output signal from A/D converter 105 and an output signal from A/D converter 106, and buffer 202 is to store message parts of an output signal from A/D converter 107 and an output signal from A/D converter 108.

Compensator 109 performs compensation processing on the output signal from A/D converter 105 and the output signal from A/D converter 106, which are input to compensator 109, at the first processing operation, and compensates the signals output from buffer 201, which is input to compensator 109, at the second processing operation using the frequency offset amount, which is a frequency offset amount of the current slot, estimated by the compensation processing at the first processing operation.

Decoder 116 does not output a received message at the first processing operation and outputs the received message at the second processing operation.

A flow of a signal in the radio communication apparatus according to the second embodiment will be described below. Herein, in the second embodiment, two processing operations are performed.

At the first processing operation, output signals from A/D converters 105 to 108 are input to buffers 201 and 202 along with compensators 109 and 110. In addition, a received message is not output from decoder 116. The processing operation except for the aforementioned processing operation is the same as the first embodiment and the explanation is omitted.

The second processing operation will be described below. When a frequency offset amount estimated at the first processing operation is input to compensators 109 and 110, output signals from A/D converters 105 and 106 that are stored at buffer 201 are input to compensator 109, and similarly output signals from A/D converters 107 and 108 are input to compensator 110.

The output signals from A/D converters 105 to 108 are at compensators 109 and 110 subjected to the compensation processing using the frequency offset amount estimated at the first time, and output to weighting coefficient calculator 111 and complex multipliers 112 and 113. Since the compensation at the second time is performed using the frequency offset amount estimated by the current data, the compensation accuracy at the second time is higher than at the first time.

Weighting coefficient calculator 111 calculates an optimal weighting coefficient from output signals from compensators 109 and 110 using a known symbol sequence of a signal. In the same way as the compensation accuracy, the accuracy of the optimal weighting coefficient calculated at the second time is higher than at the first time.

The output signals from A/D converters 105 to 108 are complex-multiplied at complex multipliers 112 and 113 using a weighting coefficient output from weighting coefficient calculator 111 and added at adder 114. An output signal from adder 114 is subjected to differential coherent detection at differential coherent detector 115 and output to decoder 116 and frequency offset estimator 117.

The output signal from differential coherent detector 115 is decoded at decoder 116 to be a received message. In addition, the output signal from differential coherent detector 115 is subjected to phase comparison with a known symbol at frequency offset estimator 117, of which result is used to calculate a rotation amount due to frequency offset in order to estimate frequency offset used in compensation processing for next slot. The estimated frequency offset is subjected to smoothing processing at averager 118 and output to compensators 109 and 110.

As described above, since an interference suppression and frequency offset estimation are performed using the frequency offset estimated with current data, it is possible to improve an accuracy of reception qualities than the first embodiment.

(Third Embodiment)

The third embodiment is the case of storing a weighting coefficient calculated at the first processing operation at a buffer and performing complex computation processing at the second processing operation using the stored weighting coefficient.

Figure 9:
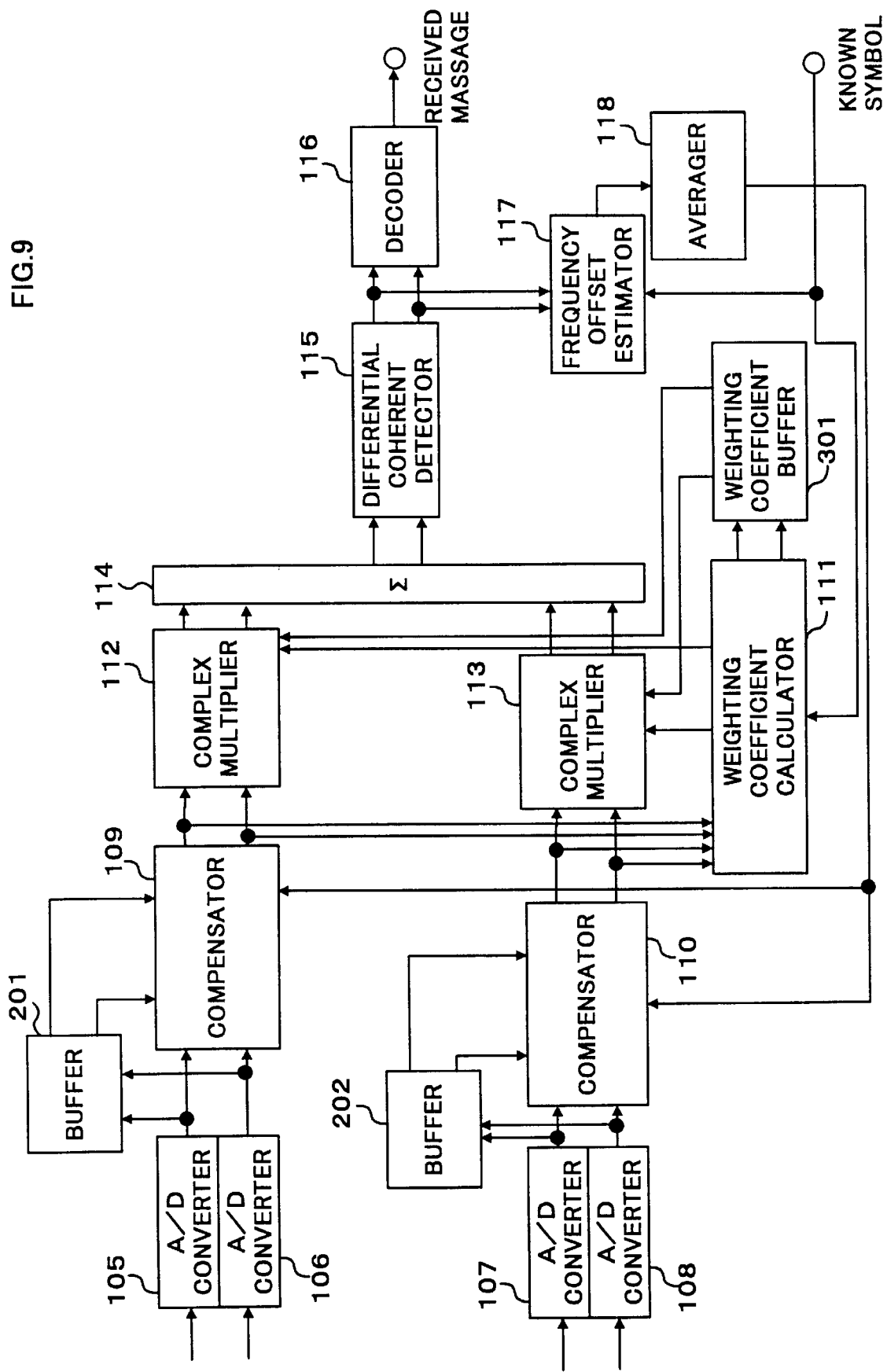
FIG. 9 is a block diagram illustrating a configuration of a radio communication apparatus according to a third embodiment.

FIG. 9 is a block diagram illustrating a configuration of a radio communication apparatus according to the third embodiment of the present invention. The radio communication apparatus illustrated in FIG. 9 adopts a configuration where weighting coefficient buffer 301 is installed in the radio communication apparatus illustrated in FIG. 8. In addition, in the radio communication apparatus illustrated in FIG. 9, the common sections to FIG. 8 have the same symbols as FIG. 8 to omit the explanation. In addition, in FIG. 9, antennas 101 and 102 and receiving RF sections 103 and 104 are omitted.

Weighting coefficient calculator 111 outputs an optimal weighting coefficient calculated using a known symbol and output signals from compensators 109 and 110 to complex multipliers 112 and 113 and weighting coefficient buffer 301. Weighting coefficient buffer 301 is to store the optimal weighting coefficient input from weighting coefficient calculator 111.

Complex multipliers 112 and 113 at the first processing operation performs complex multiplication processing on output signals from compensators 109 and 110 using the optimal weighting coefficient input from weighting coefficient calculator 111, and at the second processing operation performs complex multiplication processing on output signals from compensators 109 and 110 using the optimal weighting coefficient input from weighting coefficient buffer 301.

As described above, since an optimal weighting coefficient calculated with a slot is stored and the second complex multiplication processing is performed using the stored weighting coefficient, it is possible to calculate the optimal weighting coefficient at a single time.

In addition, the third embodiment is effective especially in the case where changes of propagation environment and a moving of a desired station are moderate and a fluctuation of frequency offset is small.

(Fourth Embodiment)

The fourth embodiment is the case of performing decoding processing using a signal with smaller error among from a signal subjected to differential coherent detection and calculation at the first operation processing and a signal subjected to differential coherent detection and calculation at the second operation processing.

Figure 10:
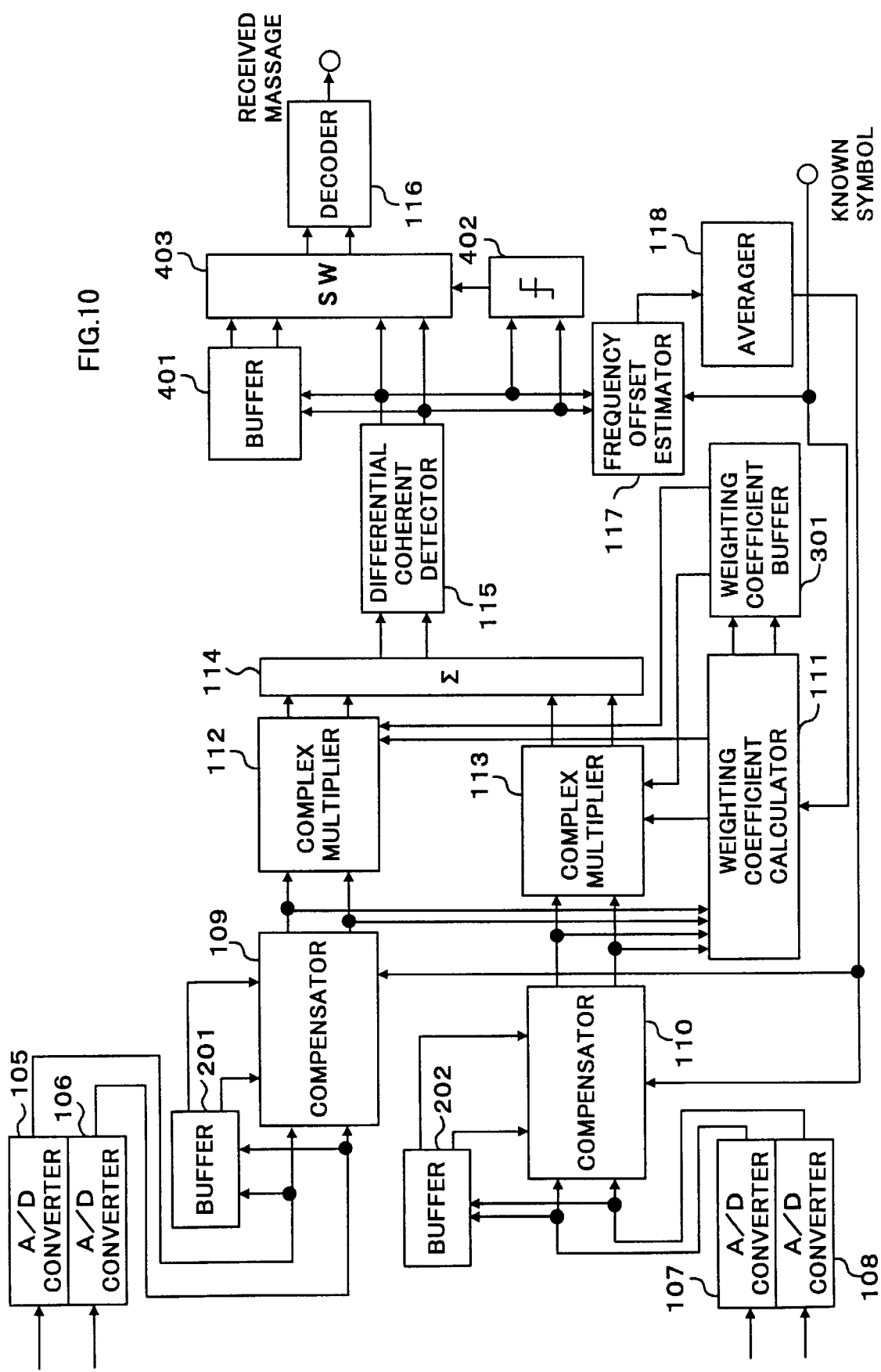
FIG. 10 is a block diagram illustrating a configuration of a radio communication apparatus according to a fourth embodiment.

FIG. 10 is a block diagram illustrating a configuration of a radio communication apparatus according to the fourth embodiment of the present invention. The radio communication apparatus illustrated in FIG. 10 adopts a configuration where buffer 401, decider 402 and switch 403 are installed in the radio communication apparatus illustrated in FIG. 9. In addition, in the radio communication apparatus illustrated in FIG. 10, the common sections to FIG. 9 have the same symbols as FIG. 9 to omit the explanation. In addition, in FIG. 10, antennas 101 and 102 and receiving RF sections 103 and 104 are omitted.

Differential coherent detector 115 performs differential coherent detection on an output signal from adder 114 to output to buffer 401, decider 402 and switch 403. Buffer 401 is to store a signal input from differential coherent detector 115.

Decider 402 calculates a respect error between a known symbol and each of output signals from differential coherent detector 115 at the first and second operation processing over a known symbol interval to compare sizes of the errors. Then, decider 402 controls switch 403 to select the output signal from differential coherent detector 115 in the case where the error at the first operation processing is larger and to select the output signal from buffer 401 in the other cases.

Switch 403 selects either of an output signal from differential coherent detector 115 or buffer 401 to output to decoder 116 based on the control of decider 402. Decoder 116 decodes the output signal from switch 403 to capture a received message.

As described above, since a signal with smaller error, which is between a known symbol and an output signal from differential coherent detector 115 obtained at the first or second operation processing, is used, it is possible to further improve reception qualities.

(Fifth Embodiment)

The fifth embodiment is the case where frequency offset is compensated by adjusting a voltage control oscillator of carrier frequency or intermediate frequency not baseband signal.

Figure 11:
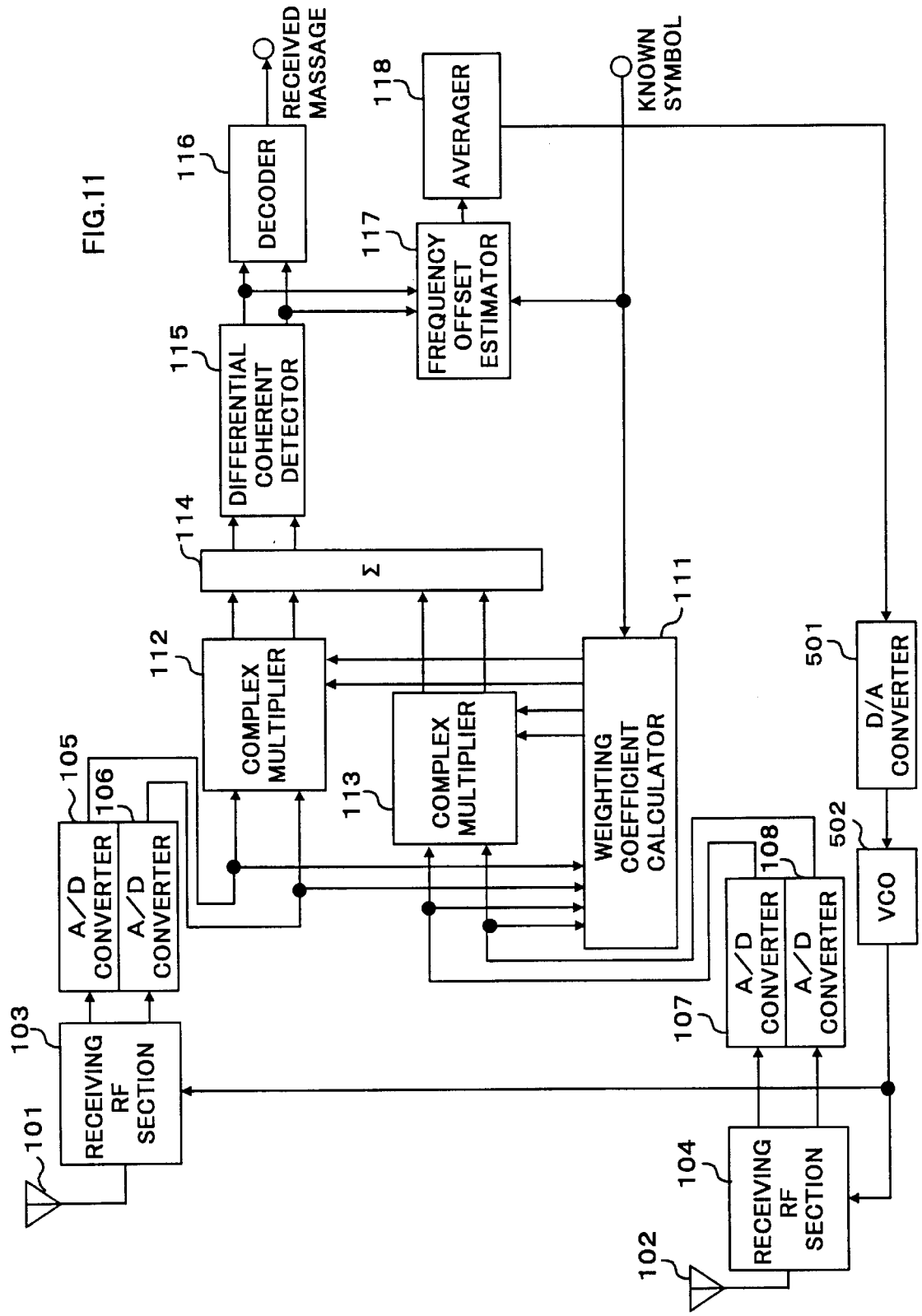
FIG. 11 is a block diagram illustrating a configuration of a radio communication apparatus according to a fifth embodiment.

FIG. 11 is a block diagram illustrating a configuration of a radio communication apparatus according to the fifth embodiment of the present invention. The radio communication apparatus illustrated in FIG. 11 adopts a configuration where D/A converter 105 and voltage control oscillator 502 are installed and compensators 109 and 110 are removed in the radio communication apparatus illustrated in FIG. 4. In addition, in the radio communication apparatus illustrated in FIG. 11, the common sections to FIG. 4 have the same symbols as FIG. 4 to omit the explanation.

Averager 118 performs smoothing on frequency offset to stabilize the compensation and outputs the resultant to D/A converter 501.

D/A converter 501 converts frequency offset that is a digital signal output from averager 118 into an analog signal. Voltage control oscillator 502 compensates the frequency offset using the analog signal output from D/A converter 501.

Receiving RF sections 103 and 104 convert respect signals of carrier frequency received at antennas 101 and 102 into baseband signals based on sine wave input from voltage control oscillator 502.

As described above, since frequency offset is compensated on an analog signal before a filter of receiving RF sections 103 and 104, losing information of received signal at filtering by frequency offset is not generated, thereby resulting in no deterioration by a filter which occurs, for example, in digital signal processing.

(Sixth Embodiment)

When compensation is performed using a digital signal, since losing information caused by a filter is generated, it is not possible to compensate completely only by digital signal processing. On the other hand, the compensation with analog signal has a poor traceability since it takes a time to stabilize an oscillator, thereby it is not possible to respond under a rapid changing environment.

Therefore, in the sixth embodiment, two-stage compensation is performed, where a received analog signal is subjected to rough frequency offset compensation not to generate losing information at the first stage, and the signal passed through a filter is converted into a digital signal, then frequency offset is compensated with high accuracy by digital signal processing with good traceability.

Figure 12:
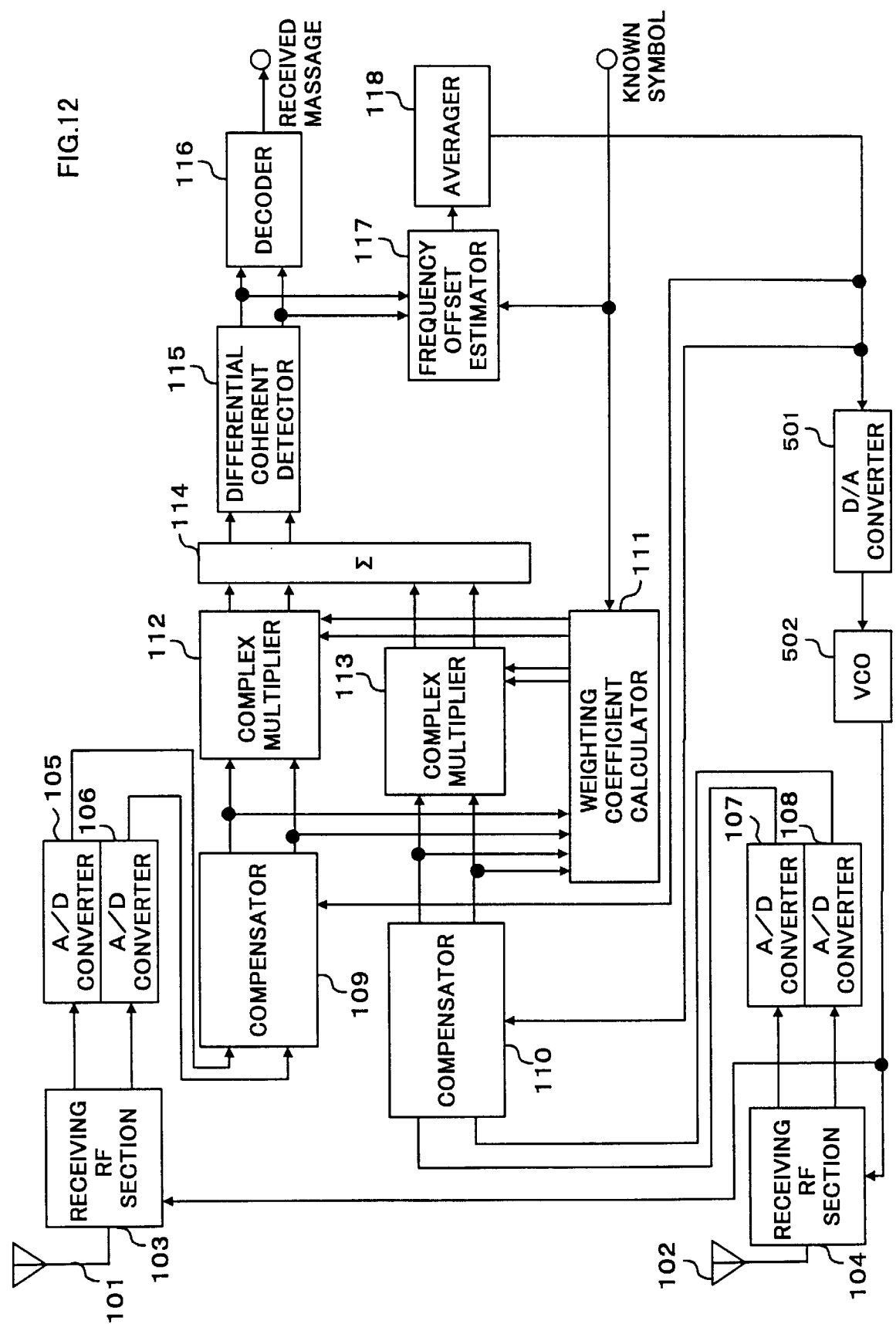
FIG. 12 is a block diagram illustrating a configuration of a radio communication apparatus according to a sixth embodiment.

FIG. 12 is a block diagram illustrating a configuration of a radio communication apparatus according to the sixth embodiment of the present invention. The radio communication apparatus illustrated in FIG. 12 adopts a configuration where compensators 109 and 110 are installed in the radio communication apparatus illustrated in FIG. 11. In addition, in the radio communication apparatus illustrated in FIG. 12, the common sections to FIG. 11 have the same symbols as FIG. 11 to omit the explanation.

Averager 118 performs smoothing on frequency offset to stabilize the compensation and output the resultant to compensators 109 and 110 and D/A converter 501. Voltage control oscillator 502 rough compensates frequency offset using an analog signal output from D/A converter 501.

Compensators 109 and 110 fine compensates frequency offset contained in output signals from A/D converters 105 to 108 using a frequency offset amount of a slot just before the target slot as a control value.

As described above, since frequency offset is rough compensated not to generate losing information at the first stage, and the signal passed through a filter is converted into a digital signal, then frequency offset is compensated with high accuracy by digital signal processing with high traceability, it is possible to prevent losing information from being generated by a filter and to improve the traceability.

(Seventh Embodiment)

The seventh embodiment is the case of, in a QPSK modulation system, rearranging all signals at the first quadrant once to average and estimating the frequency offset using the averaged value.

Figure 13:
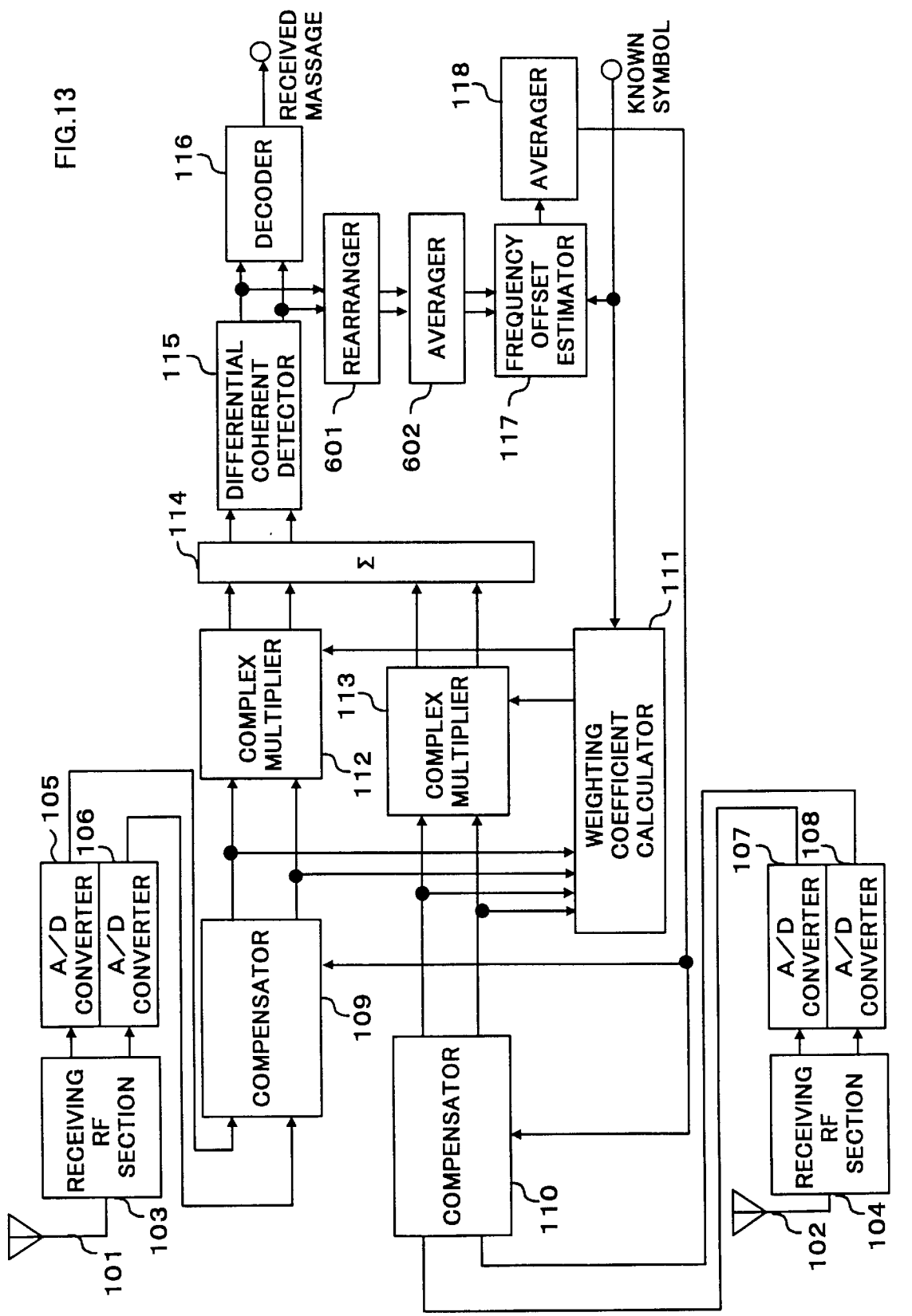
FIG. 13 is a block diagram illustrating a configuration of a radio communication apparatus according to a seventh embodiment.

FIG. 13 is a block diagram illustrating a configuration of a radio communication apparatus according to the seventh embodiment of the present invention. The radio communication apparatus illustrated in FIG. 13 adopts a configuration where rearranger 601 and averager 602 are installed in the radio communication apparatus illustrated in FIG. 4. In addition, in the radio communication apparatus illustrated in FIG. 13, the common sections to FIG. 4 have the same symbols as FIG. 4 to omit the explanation.

Figure 14:
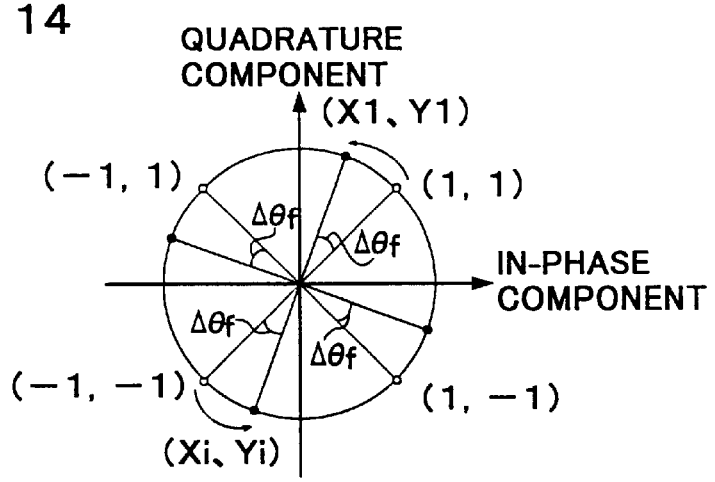
FIG. 14 is an operation explanation diagram to explain compensation of frequency offset in the radio communication apparatus according to the seventh embodiment.
Figure 15:
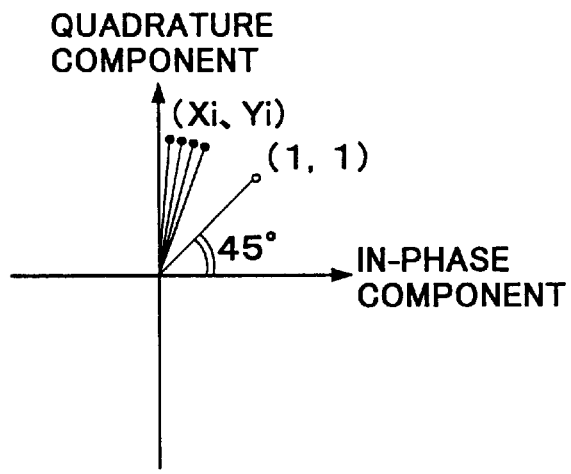
FIG. 15 is an operation explanation diagram to explain the compensation of frequency offset in the radio communication apparatus according to the seventh embodiment.
Figure 16:
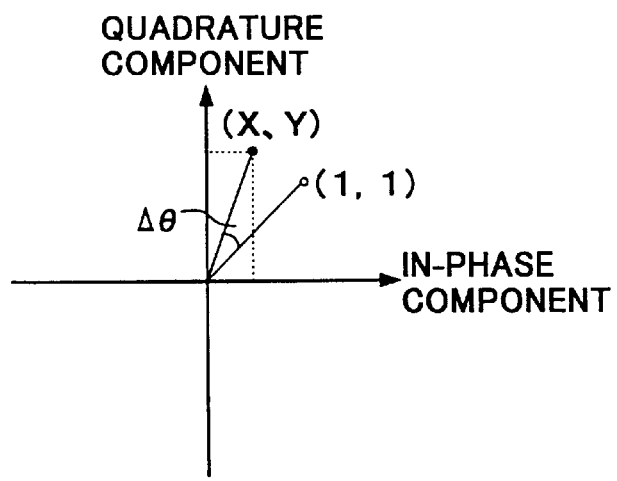
FIG. 16 is an operation explanation diagram to explain the compensation of frequency offset in the radio communication apparatus according to the seventh embodiment.

FIGS. 14 to 16 are operation explanation diagrams to explain frequency offset processing according to the seventh embodiment of the present invention.

Differential coherent detector 115 performs differential coherent detection of an output signal from adder 114, and outputs the demodulated signal to decoder 116 and rearranger 601.

Rearranger 601 rearranges output signals from differential coherent detector 115 which are present at each quadrant as illustrated in FIG. 14 at the first quadrant as illustrated in FIG. 15 to convert into positive values. Averager 602 averages over the predetermined symbols with respect to the rearranged signal points as illustrated in FIG. 6 and outputs the averaged value to frequency offset estimator 117.

Frequency offset estimator 117 estimates frequency offset Δθ illustrated in FIG. 15 using the input averaged value.

As described above, when the QPSK modulation system is used, it is possible to decrease a calculation amount needed to reduce affects due to fading and noise by perform rearranging processing before estimating frequency offset, thereby making it possible to trace changes of propagation environment and estimate a more accurate frequency offset.

In addition, in the case of QPSK modulation, since signal point positions at the first quadrant are present over angles rotated by 45° counterclockwisely from the quadrature axis of in-phase component, it is possible by performing rearranging processing to use not only a known symbol but also a message part as data to estimate frequency offset, thereby enabling a more accurate frequency offset to be calculated.

(Eighth Embodiment)

The eighth embodiment is the case of rotating positions of signal points to be arranged on the coordinate axis in a 8PSK modulation system to overlap at positions of the other signal points and then rearranging all signal points at the first quadrant.

FIGS. 17 to 20 are operation explanation diagrams to explain frequency offset processing according to the eighth embodiment of the present invention.

Figure 17:
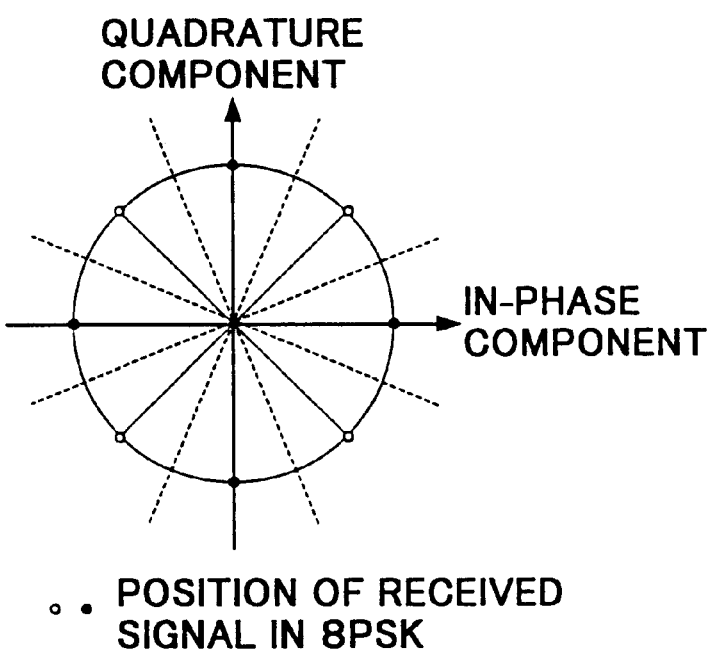
FIG. 17 is an operation explanation diagram to explain compensation of frequency offset in the radio communication apparatus according to an eighth embodiment.
Figure 19:
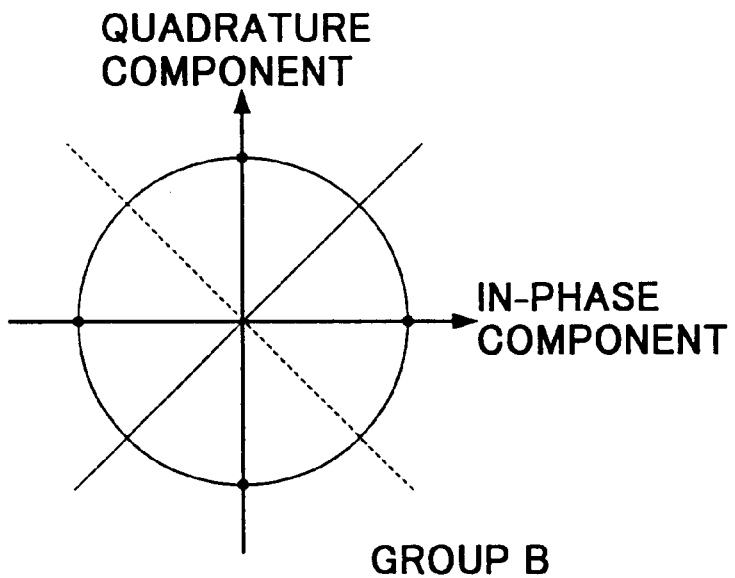
FIG. 19 is an operation explanation diagram to explain the compensation of frequency offset in the radio communication apparatus according to the eighth embodiment.
Figure 20:
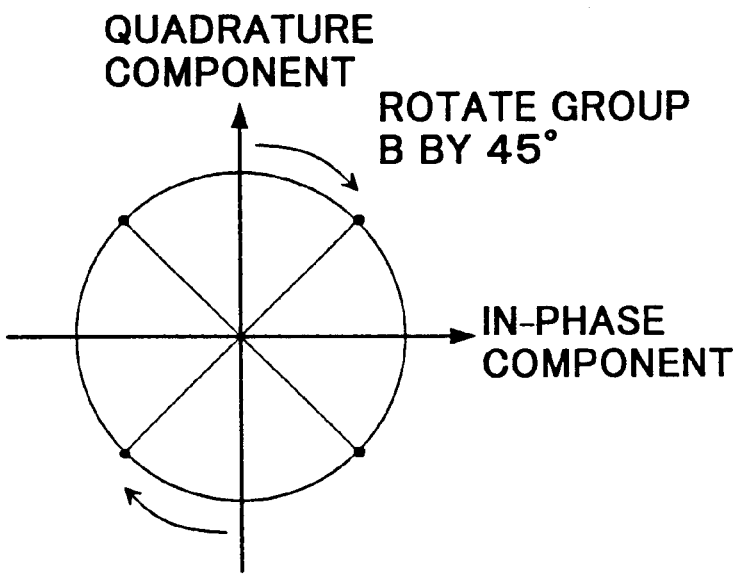
FIG. 20 is an operation explanation diagram to explain the compensation of frequency offset in the radio communication apparatus according to the eighth embodiment.

As illustrated in FIG. 17, eight signal point positions are present in the 8PSK modulation system. Rearranger 601 decides positions of output signals from differential coherent detector 115 subjected to 8PSK modulation to separate into two groups according to positions of signal points as illustrated in FIG. 18 and FIG. 19, and then converts signal point positions of a group into those of another group as illustrated in FIG. 20.

Figure 18:
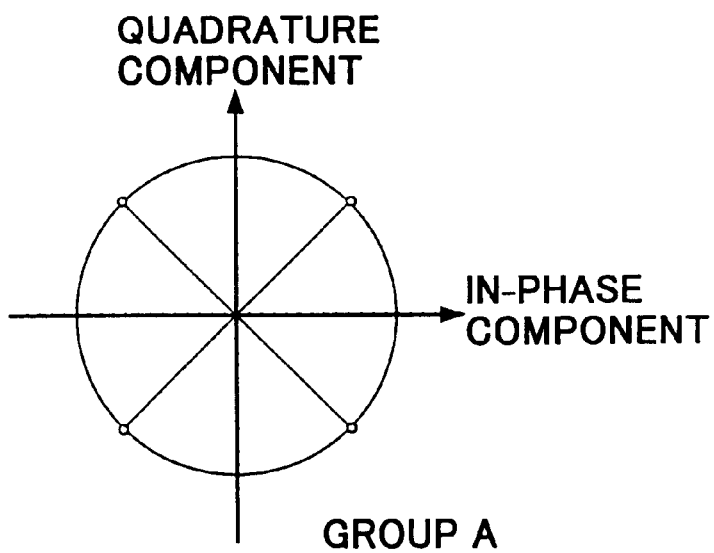
FIG. 18 is an operation explanation diagram to explain the compensation of frequency offset in the radio communication apparatus according to the eighth embodiment.

For example, in the case of assuming that signal point positions illustrated in FIG. 17 are group A signal point positions illustrated in FIG. 18 are group B, when a signal point position is group A, rearranger 601 rearranges the signal point at the first quadrant to convert into a positive value without another processing as well as the eighth embodiment. On the other hand, when a signal point position is group B, rearranger 601 rotates the signal point position by 45° to shift to the same position as signal point of group A, and then rearranging the shifted point at the first quadrant to convert into a positive value as well as the eighth embodiment.

As described above, it is possible to rearrange input signals in the 8PSK modulation system at the same signal point positions as in the QPSK modulation system by rotating positions of signal points to be arranged on the coordinate axis to overlap at positions of other signal points. It is thus possible to decrease a calculation amount needed to reduce affects due to fading and noise, thereby enabling tracing of changes of propagation environment and estimating of a more accurate frequency offset.

In addition, the present invention is not limited to the above described embodiments, and various variations and modifications may be possible without departing from the scope of the present invention. For example, the above described embodiments explains about the case where the number of antennas is two. However, the basic operation is the same when the number of antennas is three.

As been apparent from the above description, according to the radio communication apparatus and radio communication method of the present invention, in the case of estimating frequency offset of reverse link, an interference signal is first eliminated from a received signal to obtain a desired signal because it is supposed that the interference signal is contained in the desired signal, it is thus possible to calculate frequency offset using the desired signal subjected to differential coherent detection, enabling estimating of correct frequency offset amount.

What is claimed is:

1. A radio communication apparatus comprising:
   a compensation device that compensates frequency offset of each of signals received at a plurality of antennas;
   an interference component suppression device that suppresses an interference component of an output signal from the compensation device;
   a differential coherent detection device that performs deferential coherent detection of an output signal from the interference component suppression device to output a demodulated signal;
   a decoding device that decodes said demodulated signal to capture desired data; and
   a frequency offset estimation device that estimates frequency offset using said demodulated signal.

2. The radio communication apparatus according to claim 1, wherein the compensation device controls a digital-converted signal using the frequency offset estimation result.

3. The radio communication apparatus according to claim 2, wherein the compensation device temporarily stores the digital-converted signal at a buffer, and compensates the frequency offset on a signal of a current slot stored in the buffer using a frequency offset amount of the current slot estimated by the frequency offset estimation device.

4. The radio communication apparatus according to claim 1, wherein the interference component suppression device comprising:
   a weighting coefficient calculation device that calculates an optimal weighting coefficient for each of output signals from the compensation device based on a known symbol;
   a complex multiplication device that multiplies each of said output signals from the compensation device by the optimal weighting coefficient; and
   an adding device that adds an output signal from the complex multiplication device.

5. The radio communication apparatus according to claim 4, wherein the weighting coefficient calculation device stores the calculated optimal weighting coefficient, and the complex multiplication device multiplies a signal of a current slot output from the compensation device by a weighting coefficient stored at a buffer.

6. The radio communication apparatus according to claim 5, further comprising a decision device that decides sizes of errors of a demodulated signal of the current slot and a demodulated signal stored at a buffer and outputs a demodulated signal having smaller error to the decoding device.

7. The radio communication apparatus according to claim 1, wherein the compensation device controls a received analog signal using the frequency offset estimation result.

8. The radio communication apparatus according to claim 1, wherein the compensation device controls a received analog signal using the frequency offset estimation result to roughly compensate the frequency offset, and controls a digital-converted signal to finely compensate the frequency offset.

9. A communication terminal apparatus capturing desired data from a received signal using a radio communication apparatus according to claim 1.

10. A base station apparatus capturing desired data from a received signal using a radio communication apparatus according to claim 1.

11. A radio communication method comprising:
    compensating frequency offset of each of signals received at a plurality of antennas;
    suppressing an interference component of a signal in which the frequency offset is compensated;
    performing deferential coherent detection of a signal in which the interference component is suppressed to demodulate the signal; and
    decoding the demodulated signal to capture desired data, while estimating frequency offset using said demodulated signal.

12. The radio communication method according to claim 11, further comprising controlling a digital-converted signal using the frequency offset estimation result.

13. The radio communication method according to claim 12, further comprising temporarily storing a digital-converted signal of each of signals received at a plurality of antennas at a buffer, while estimating frequency offset using the digital-converted signal; and
    compensating the frequency offset of a signal of a current slot stored at the buffer using the estimated frequency offset amount of the current slot.

14. The radio communication method according to claim 11, further comprising:
    calculating an optimal weighting coefficient for each of compensated signals based on a known symbol;
    multiplying each of said compensated signals by the optimal weighting coefficient to suppress an interference component; and
    adding each signal.

15. The radio communication method according to claim 14, further comprising:
    storing the calculated optimal weighting coefficient at a buffer; and
    multiplying the compensated signal of a current slot by a weighting coefficient stored at the buffer.

16. The radio communication apparatus according to claim 15, further comprising:
    deciding sizes of errors of a demodulated signal of the current slot and a demodulated signal stored at the buffer to decode a demodulated signal having smaller error.

17. The radio communication method according to claim 11, further comprising controlling a received analog signal using the frequency offset estimation result.

18. The radio communication method according to claim 11, further comprising:
    controlling a received analog signal using the frequency offset estimation result to roughly compensate the frequency offset; and
    controlling a digital-converted signal to finely compensate the frequency offset.

* * * * *

UNITED STATES PATENT AND TRADEMARK OFFICE
CERTIFICATE OF CORRECTION

PATENT NO.   : 6,493,397 B1
DATED        : December 10, 2002
INVENTOR(S)  : H. Takahashi et al.

It is certified that error appears in the above-identified patent and that said Letters Patent is hereby corrected as shown below:

<u>Title page,</u>
Item [73], Assignee, after "Co." insert -- , --.

Signed and Sealed this

Fifteenth Day of July, 2003

JAMES E. ROGAN
*Director of the United States Patent and Trademark Office*